United States Patent [19]
Cobb

[11] 3,737,176
[45] June 5, 1973

[54] DUST FLAP FOR TRAILERS AND TRUCKS

[76] Inventor: Richard D. Cobb, 940 Second Ave. S., Glasgow, Mont. 59230

[22] Filed: Nov. 4, 1971

[21] Appl. No.: 195,595

[52] U.S. Cl. ..................................280/154.5 R
[51] Int. Cl. .................................B62d 25/16
[58] Field of Search ...............280/154.5 R

[56] References Cited

UNITED STATES PATENTS

| | | | |
|---|---|---|---|
| 2,826,428 | 3/1958 | Lincoln | 280/154.5 R |
| 3,401,953 | 9/1968 | Prohl | 280/154.5 R |
| 3,582,108 | 6/1971 | Carlton | 280/154.5 R |

Primary Examiner—Benjamin Hersh
Assistant Examiner—Robert R. Song

[57] ABSTRACT

A flap for depending behind the wheels of a trailer or truck. The device is used in pairs and consists of a pair of hinged and spring loaded members, one of which is secured to the flap and prevents the flap from being torn from its mount when the rear wheels of the vehicle tend to climb a bumper when the vehicle is backed up.

1 Claim, 3 Drawing Figures

PATENTED JUN 5 1973

3,737,176

INVENTOR.
RICHARD D. COBB

DUST FLAP FOR TRAILERS AND TRUCKS

This invention relates to weather or dust flaps behind the rear wheels of trailers and tractors.

It is therefore the primary purpose of the invention to provide a flap which may not be torn from its mounting position.

The flap devices of the prior art are frequently torn from the vehicle when the vehicle is backing up against a bumper or stop or even sometimes by rocks. The wheels have a tendency to crawl up the bumper and the flap is pinched in between the tire and the bumper or stop and thus is ripped from the vehicle.

Another object of this invention is to provide a flap device which will have spring means to enable the flap to lower itself when pinched between the wheel and the bumper and thus will prevent it from being torn from its mount.

A further object of this invention is to provide a device of the type described which will have a pair of oppositely opposed and aligned angle iron members of L-shaped configuration with sleeves on one edge which will align with each other and receive a bolt and a spring which provides the tension means for returning the lower bracket to its upper position after the vehicle moves forward again.

Other objects of the present invention are to provide a dust flap for trucks and trailers which is simple in design, inexpensive to manufacture, rugged in construction, easy to use and efficient in operation.

These and other objects will be readily evident upon a study of the following specification and the accompanying drawing, wherein.

Figure 1:
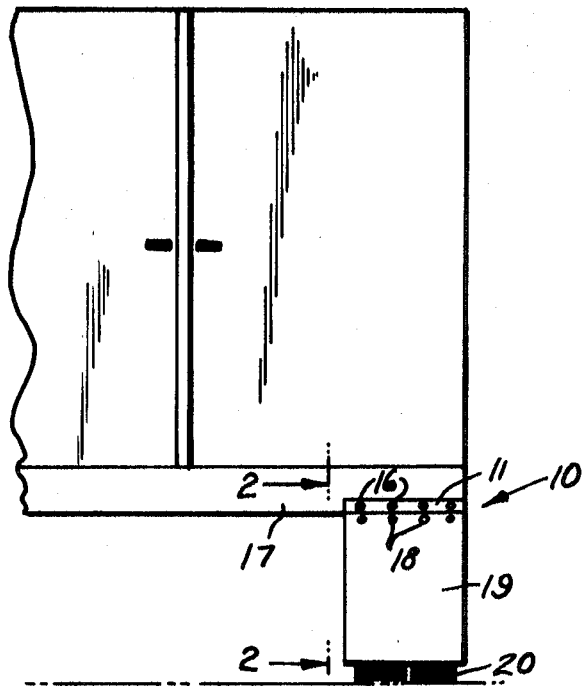
FIG. 1 is a fragmentary rear view of a trailer showing one of the devices installed thereto.
Figure 2:
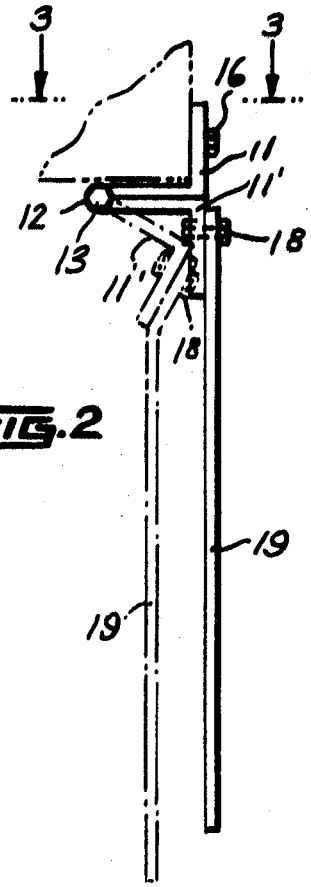
FIG. 2 is an enlarged view taken along the line 2—2 of FIG. 1, showing a lowered position of the flap and its attached bracket in phantom lines.
Figure 3:
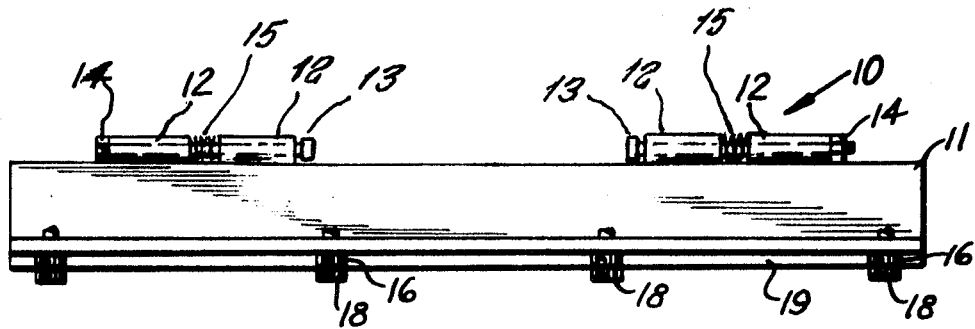
FIG. 3 is a view taken along the line 3—3 of FIG. 2.

According to this invention, a dust flap 10 for trailers and tractors, is shown to include an L-shaped bracket 11 and an L-shaped bracket 11' having, a pair of spaced apart sleeve members 12 which align with each other and receive a bolt fastener 13 and a nut fastener 14. Carried upon the bolt fastener 13 is a torsion spring 15 which provides return means for dust flap 10. A plurality of bolt fasteners 16 provides a means of securing L-shaped bracket 11 to the trailer 17 or truck body. A plurality of spaced apart bolt fasteners 18 provides a means for securing the flexible member 19 to the L-shaped bracket 11' in order that it will depend downwards therefrom. The flexible members 19 and their associated brackets 11 and 11' provides a means of preventing the dust and precipitation from coming up rearwards from the wheels 20 of the trailer 17 or truck.

In use, when the trailer 17 is backing up against a bumper or stop, the flexible member 19 being pinched between the wheels 20 and the bumper will be pulled downwards against the torsion of the spring 15 and not torn from the trailer 17 and when the vehicle is moved forward again the flexible member 19 being released will automatically be spring urged upwards and the brackets 11 and 11' will abut again with each other.

It will be noted that the spring 15 may be wound so as to increase its tension when used with heavy flexible members 19.

What I claim is:

1. In a dust flap for trailers and trucks, the combination of an elongated horizontally extending first bracket secured stationarily to a vehicle body rear end and located rearward of a rear wheel of said vehicle, said first bracket being of cross-sectional L-shape and including a vertical leg positioned adjacent said rear end of said body and receiving mounting bolts therethrough secured to said rear end, a horizontal leg of said L-shaped bracket extending under said body in a forwardly direction, a forward edge of said horizontal leg having spaced-apart sleeves integral therewith, said sleeves being axially aligned; a second elongated, horizontally extending bracket being pivotably supported from said stationary bracket, said second bracket being likewise of cross-sectional L-shape and having a horizontal leg normally retained adjacent an underside of the horizontal leg of said stationary bracket, spaced-apart sleeves integral with a forward, longitudinal edge of said horizontal leg, said sleeves being axially aligned; each sleeve of said stationary bracket being aligned with one sleeve of said pivotable bracket, pivot bolts being inserted through said aligned sleeves, a torsion coil spring being fitted around each said pivot bolt, one end of said spring bearing against said stationary bracket while the other end bears against said pivotable bracket so to normally maintain said pivotable bracket with its horizontal leg abutting against the underside of the horizontal leg of said stationary bracket, a rear end of said pivotable bracket horizontal leg being adjacent a vertically downward leg of said pivotable bracket and to which the upper end of a flexible dust flap panel is secured, said panel extending downwardly sufficiently to shield a major portion of a rear side of said vehicle wheels, whereby when said panel is pinched between said wheels and a stationary bumper during backing up of said vehicle, said panel being downwardly pulled causes said pivotable bracket to downwardly pivot so to prevent said panel to become torn off.

* * * * *